(12) United States Patent
Tajiri et al.

(10) Patent No.: US 11,537,036 B2
(45) Date of Patent: Dec. 27, 2022

(54) LIGHT SOURCE APPARATUS AND PROJECTOR

(71) Applicant: SONY CORPORATION, Tokyo (JP)

(72) Inventors: Shinichiro Tajiri, Tokyo (JP); Izushi Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 26 days.

(21) Appl. No.: 17/250,549

(22) PCT Filed: Jul. 26, 2019

(86) PCT No.: PCT/JP2019/029412
§ 371 (c)(1),
(2) Date: Feb. 2, 2021

(87) PCT Pub. No.: WO2020/031750
PCT Pub. Date: Feb. 13, 2020

(65) Prior Publication Data
US 2021/0302821 A1    Sep. 30, 2021

(30) Foreign Application Priority Data

Aug. 10, 2018  (JP) .............................. JP2018-151985

(51) Int. Cl.
*G03B 21/20*    (2006.01)
(52) U.S. Cl.
CPC ....... *G03B 21/204* (2013.01); *G03B 21/2066* (2013.01)
(58) Field of Classification Search
CPC .............. G03B 21/204; G03B 21/2066; G03B 21/2013; G03B 21/005; G03B 21/2033;
(Continued)

(56) References Cited

U.S. PATENT DOCUMENTS 9,482,937 B2 * 11/2016 Cheng ................ G03B 21/2033
2006/0227570 A1 * 10/2006 Rutherford et al. ... H04N 9/315
348/E9.027
(Continued)

FOREIGN PATENT DOCUMENTS

CN    101061591 A    10/2007
CN    101151908 A    3/2008
(Continued)

OTHER PUBLICATIONS

International Search Report and Written Opinion of PCT Application No. PCT/JP2019/029412, dated Oct. 15, 2019, 12 pages of ISRWO.

*Primary Examiner* — Magda Cruz
(74) *Attorney, Agent, or Firm* — Chip Law Group

(57) ABSTRACT

A light source apparatus (1) according to the present disclosure includes a wavelength conversion device (10) that includes two or more wavelength conversion units (11-13) serially coupled in a first direction. The wavelength conversion device (10) has a configuration in which the two or more wavelength conversion units (11-13) generate respective converted lights having wavelengths different from each other to generate two or more converted lights. The two or more wavelength conversion units (11-13) each include a first end surface and a second end surface that are formed in a direction parallel to the first direction, and a light entering surface (43) that is formed in a second direction different from the first direction and which an excitation light for generating the converted light enters. The first end surface (41) of one wavelength conversion unit (13) positioned at one end of the wavelength conversion device (10) of the two or more wavelength conversion units (11-13) is configured to be a light extraction surface from which the two or more
(Continued)

converted lights are extracted out of the excitation light and the two or more converted lights.

14 Claims, 10 Drawing Sheets

(58) Field of Classification Search
CPC ..... G03B 21/208; F21Y 2115/10; F21V 7/28; F21V 9/38; F21V 13/12; H04N 9/3152; H04N 9/3158; H04N 9/3161; H04N 9/3164; H04N 9/3182
See application file for complete search history.

(56) References Cited

U.S. PATENT DOCUMENTS

| | | | |
|---|---|---|---|
| 2007/0280622 A1* | 12/2007 | Rutherford | G02B 6/0068 385/142 |
| 2009/0034292 A1* | 2/2009 | Pokrovskiy | G02B 6/0028 362/617 |
| 2009/0078949 A1 | 3/2009 | Bechtel et al. | |
| 2015/0362154 A1 | 12/2015 | Liao et al. | |
| 2016/0084452 A1 | 3/2016 | Hikmet et al. | |
| 2018/0106460 A1 | 4/2018 | Van Bommel et al. | |
| 2018/0284583 A1* | 10/2018 | Koizumi | G03B 21/2033 |
| 2018/0363858 A1* | 12/2018 | Peeters | G02B 6/0003 |
| 2020/0241190 A1* | 7/2020 | Ivanova | G02B 6/0003 |

FOREIGN PATENT DOCUMENTS

| | | |
|---|---|---|
| CN | 105222047 A | 1/2016 |
| CN | 107076400 A | 8/2017 |
| CN | 107438738 A | 12/2017 |
| CN | 108139535 A | 6/2018 |
| CN | 108368975 A | 8/2018 |
| EP | 1815532 A1 | 8/2007 |
| EP | 1864504 A1 | 12/2007 |
| EP | 2955428 A1 | 12/2015 |
| EP | 2998790 A1 | 3/2016 |
| EP | 3281234 A1 | 2/2018 |
| EP | 3350503 A1 | 7/2018 |
| EP | 3365598 A1 | 8/2018 |
| JP | 2008-521233 A | 6/2008 |
| JP | 2008-536266 A | 9/2008 |
| JP | 2012-063567 A | 3/2012 |
| JP | 2013-029622 A | 2/2013 |
| JP | 2015-094824 A | 5/2015 |
| JP | 2016-004269 A | 1/2016 |
| JP | 2017-009981 A | 1/2017 |
| JP | 2017-535031 A | 11/2017 |
| JP | 2018-533180 A | 11/2018 |
| JP | 2018-536973 A | 12/2018 |
| KR | 10-2007-0116029 A | 12/2007 |
| RU | 2017113768 A | 10/2018 |
| TW | 200631202 A | 9/2006 |
| TW | 200702597 A | 1/2007 |
| TW | I489141 B | 6/2015 |
| TW | 201546494 A | 12/2015 |
| WO | 2006/054203 A1 | 5/2006 |
| WO | 2006/104907 A1 | 10/2006 |
| WO | 2016/045957 A1 | 3/2016 |
| WO | 2016/162233 A1 | 10/2016 |
| WO | 2017/067781 A1 | 4/2017 |
| WO | 2017/097762 A1 | 6/2017 |

* cited by examiner

[FIG. 1]
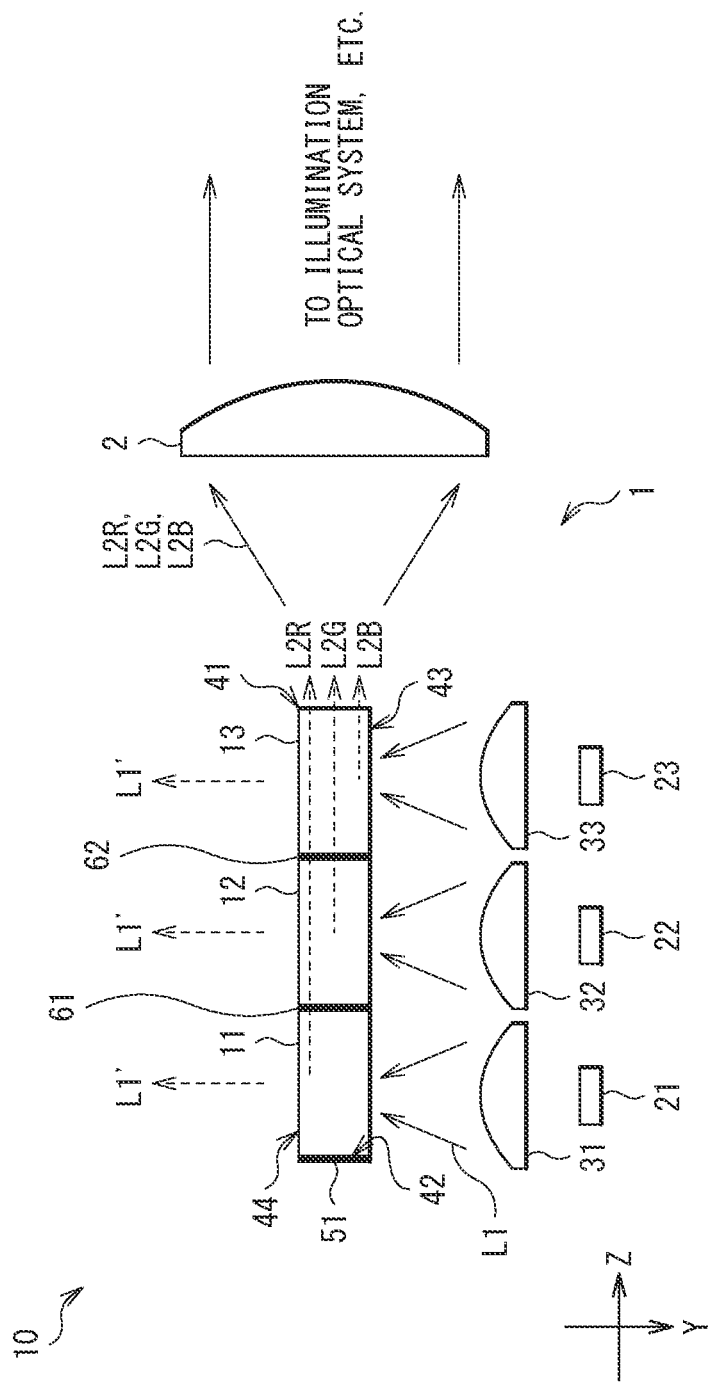

[FIG. 2]
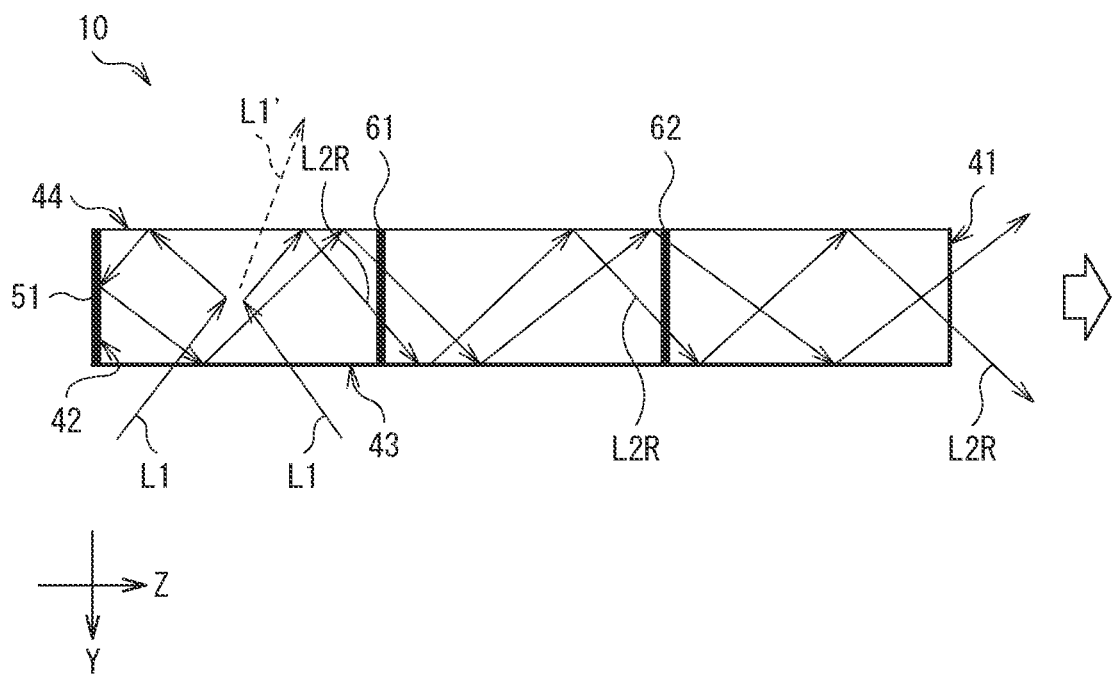

[FIG. 3]
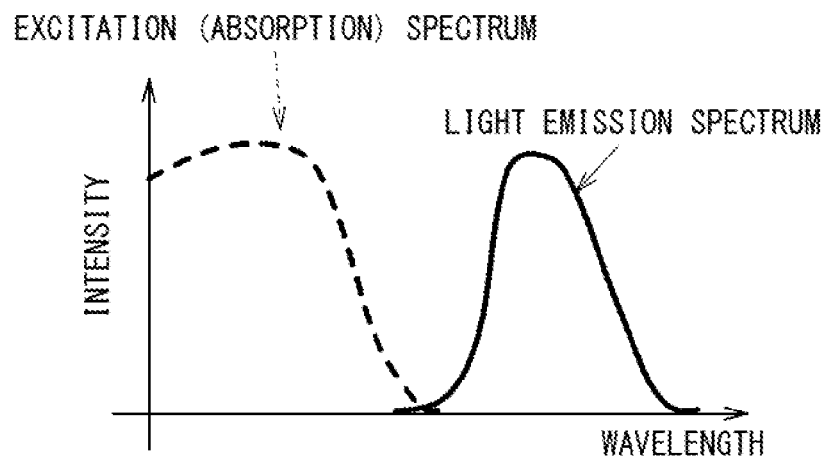
[FIG. 4]
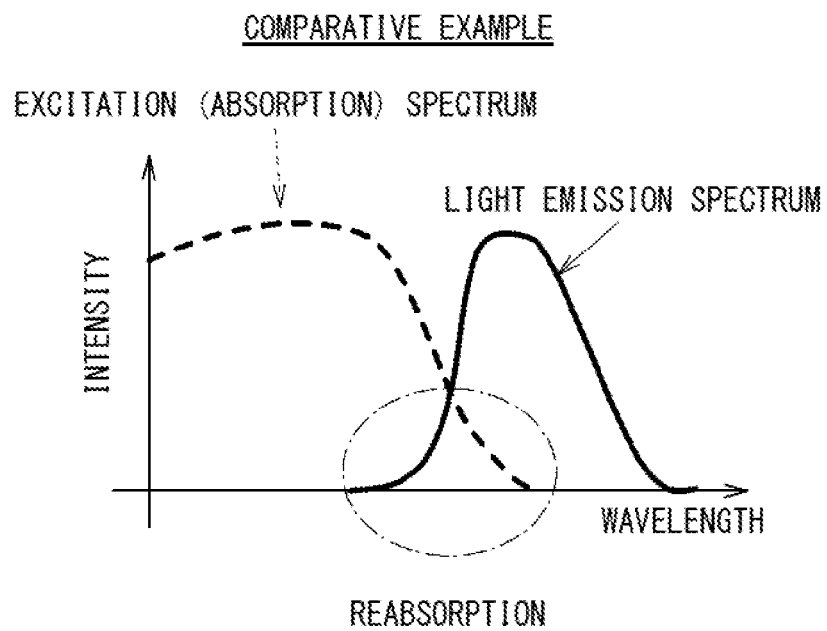

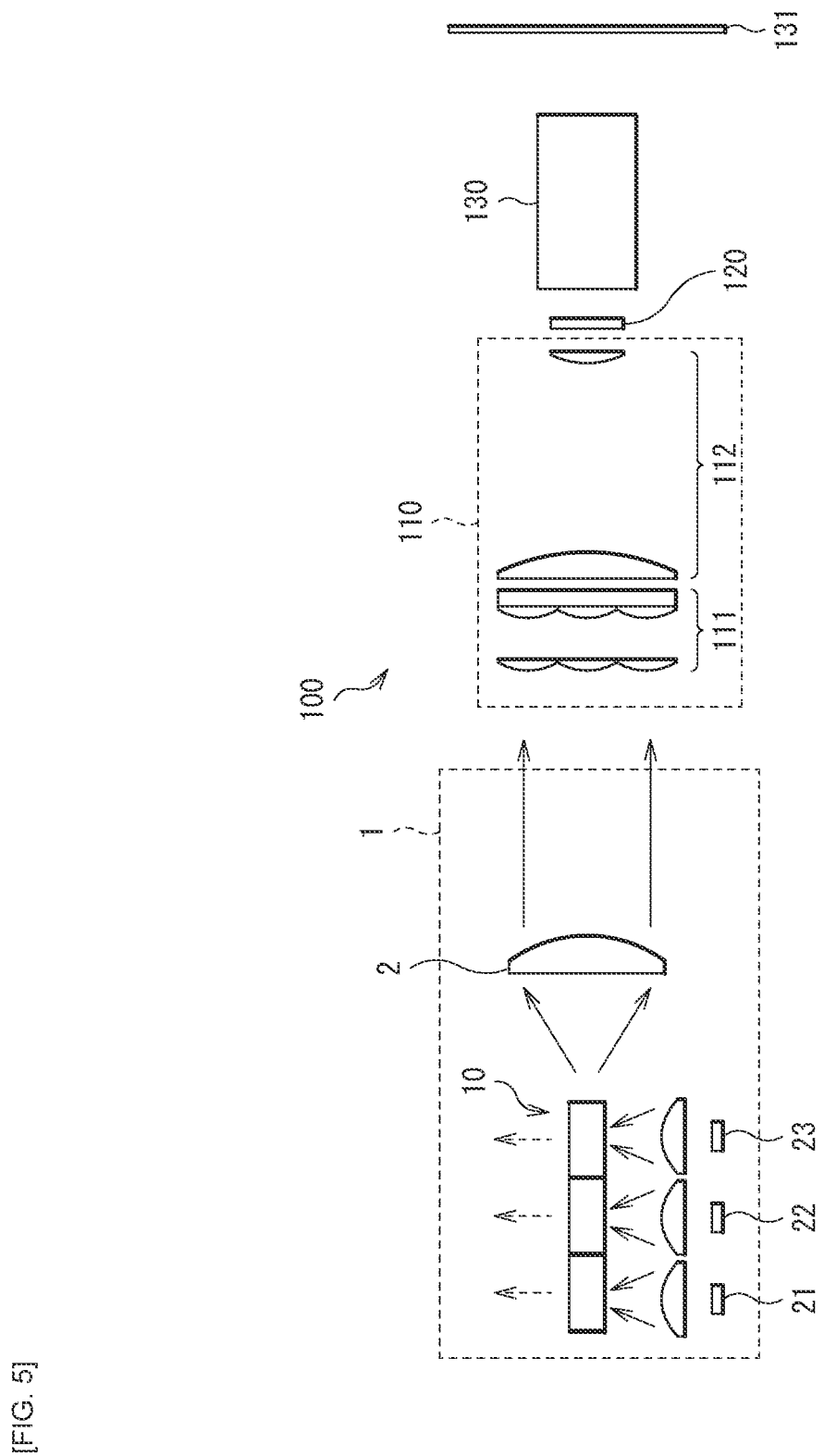
[FIG. 5]

[FIG. 6]
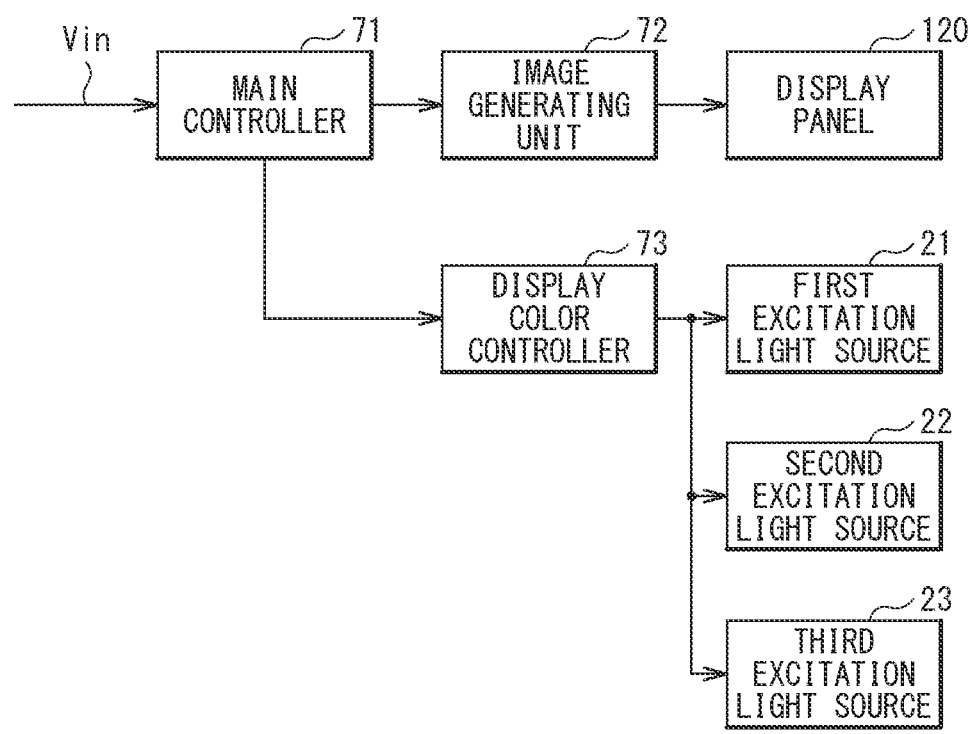

[FIG. 7]
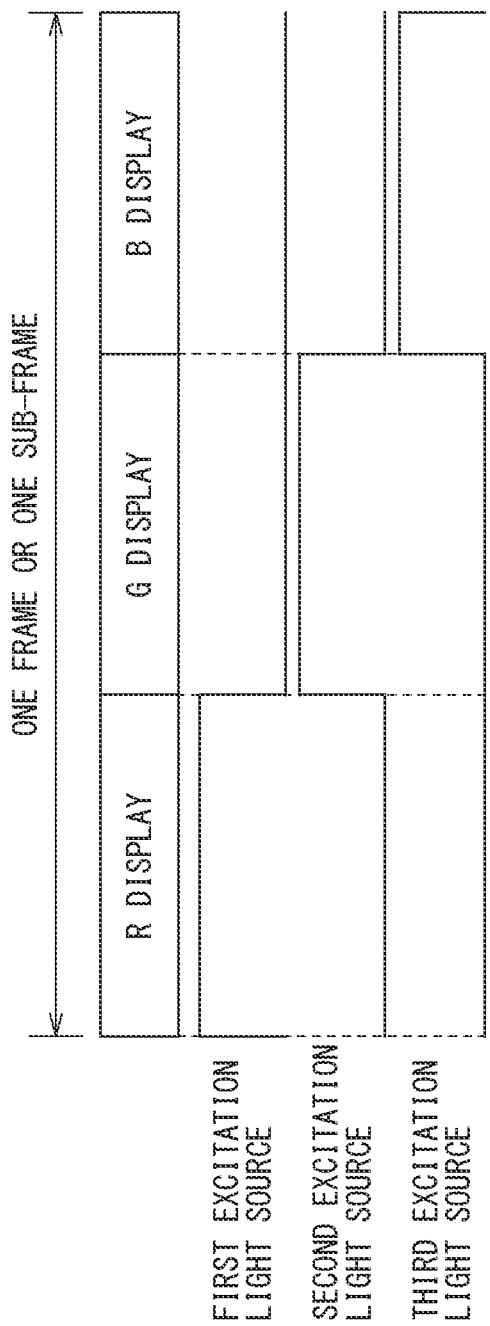

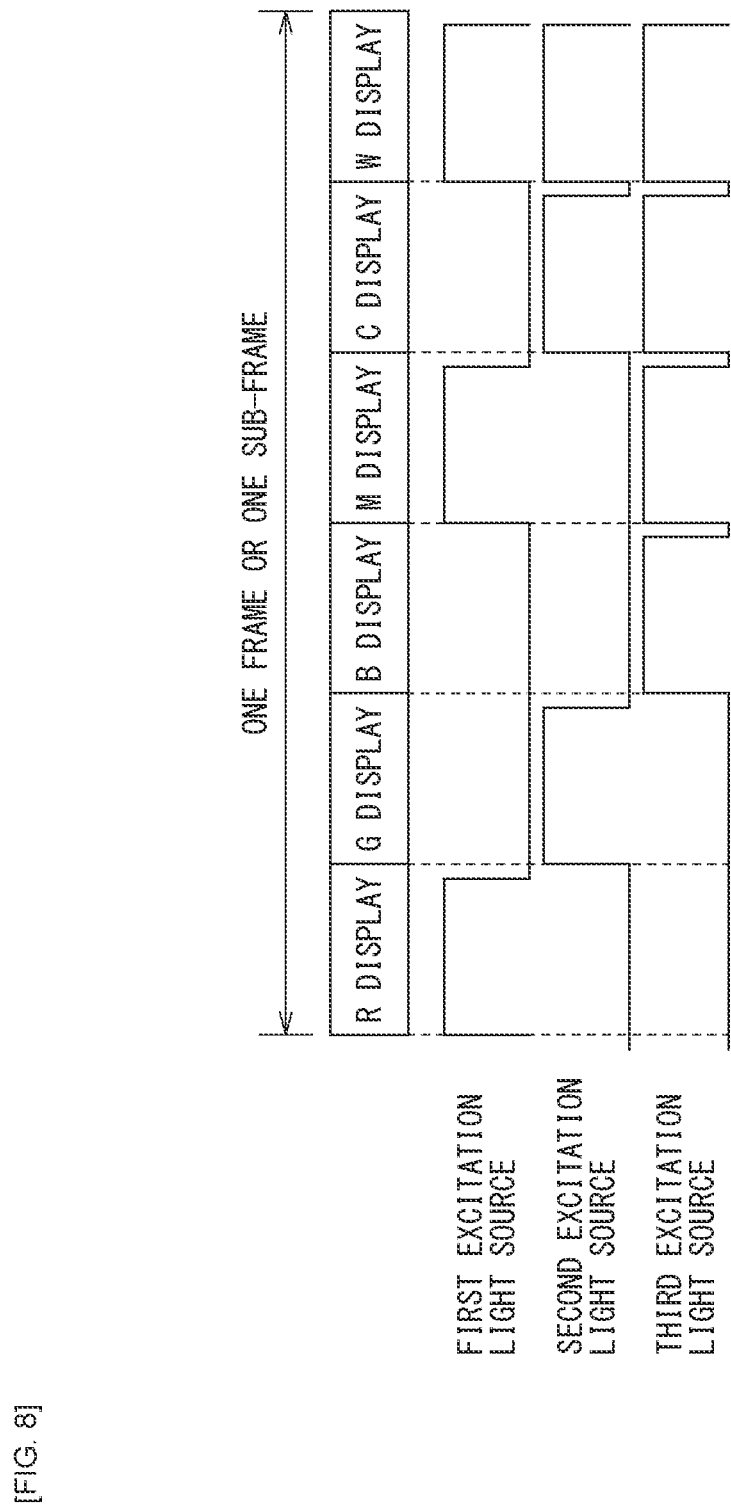
[FIG. 8]

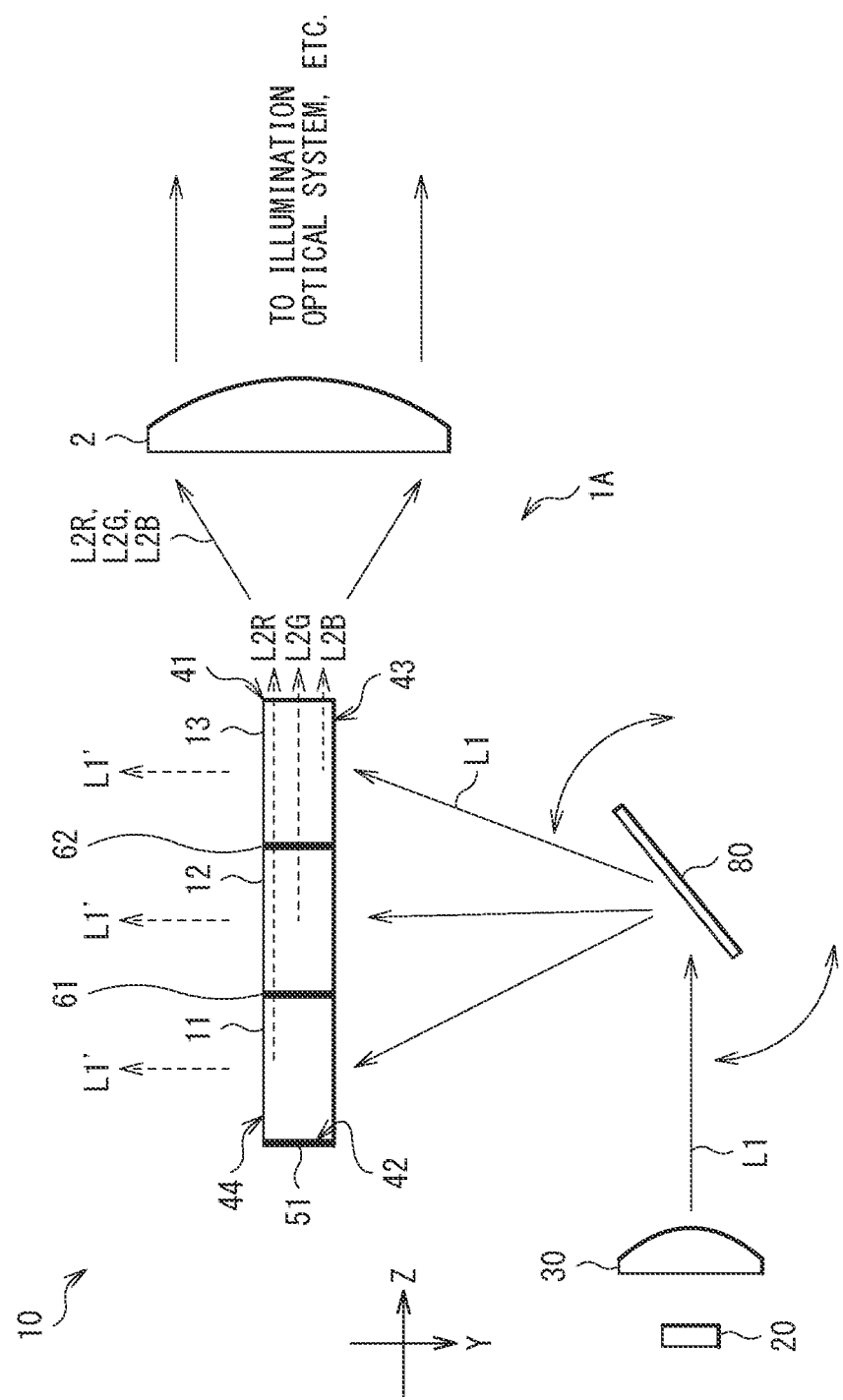
[FIG. 9]

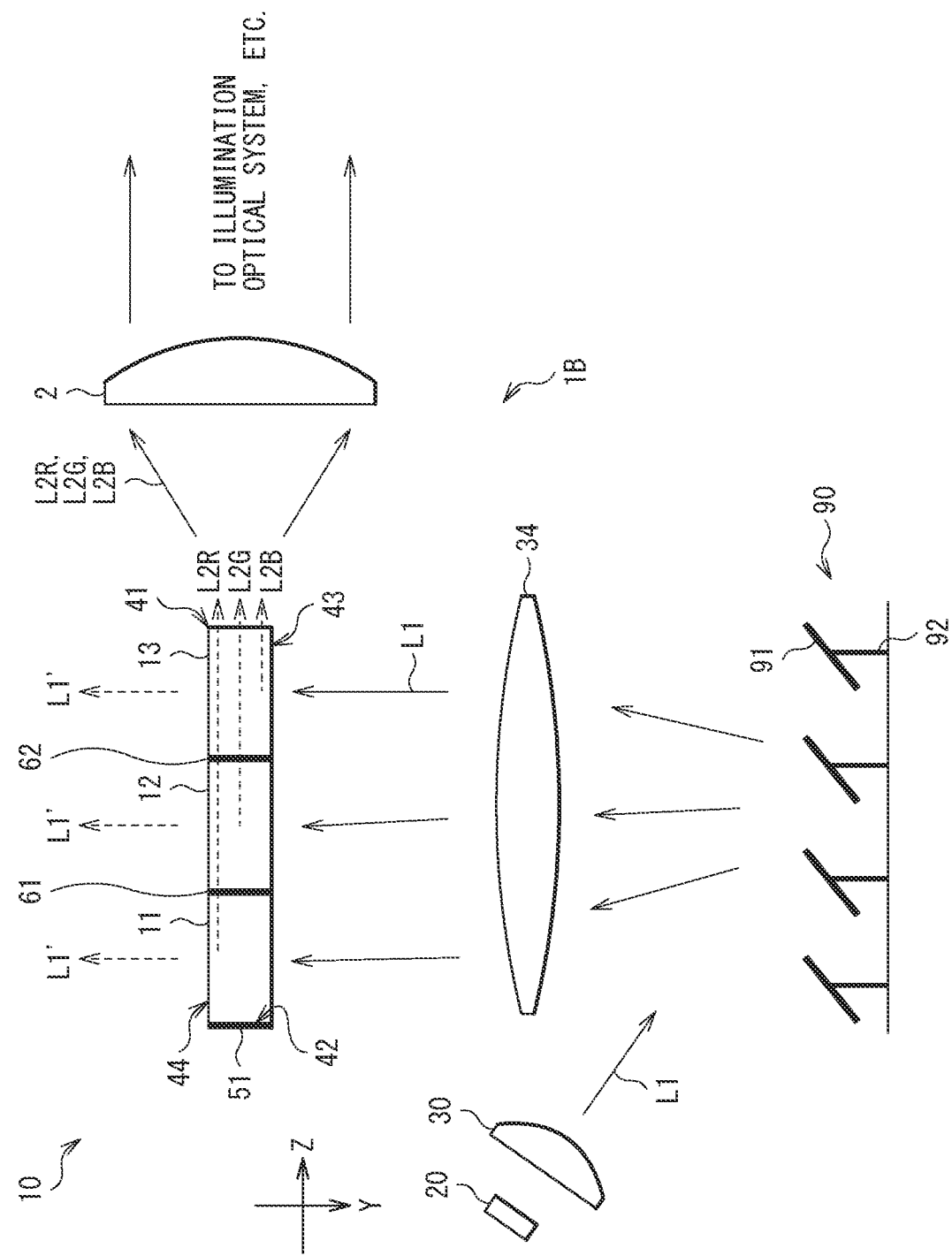
[FIG. 10]

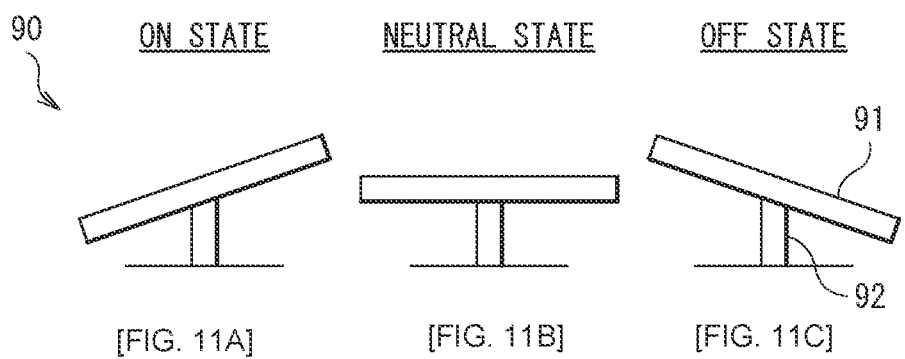

LIGHT SOURCE APPARATUS AND PROJECTOR

CROSS REFERENCE TO RELATED APPLICATIONS

This application is a U.S. National Phase of International Patent Application No. PCT/JP2019/029412 filed on Jul. 26, 2019, which claims priority benefit of Japanese Patent Application No. JP 2018-151985 filed in the Japan Patent Office on Aug. 10, 2018. Each of the above-referenced applications is hereby incorporated herein by reference in its entirety.

TECHNICAL FIELD

The present disclosure relates to a light source apparatus that emits two or more lights having different wavelengths, and a projector that generates a projection image using a light from the light source apparatus.

BACKGROUND ART

For example, as a light source apparatus to be used in a projector, a configuration is known in which a light source and a rod-shaped wavelength conversion member that performs wavelength conversion of a light from the light source are combined (see PTLs 1 to 3). This light source apparatus has a configuration in which a light that is finally emitted includes not only a converted light after the wavelength conversion but also the light from the light source used for the wavelength conversion, or light from other light sources.

CITATION LIST

Patent Literature

PTL 1: Japanese Unexamined Patent Application Publication No. 2012-63567
PTL 2: Japanese Unexamined Patent Application Publication No. 2015-94824
PTL 3: Japanese Unexamined Patent Application Publication No. 2017-9981

SUMMARY OF THE INVENTION

A light source apparatus having a configuration that emits light other than a converted light resulting from wavelength conversion involves a difference in light ray angular distribution between wavelengths. Accordingly, for example, in a case where it is used in a projector, color unevenness occurs.

It is desirable to provide a light source apparatus and a projector that are each able to so generate two or more lights having different wavelengths that a light ray angular distribution is substantially the same between the wavelengths.

A light source apparatus according to one embodiment of the present disclosure includes a wavelength conversion device. The wavelength conversion device includes two or more wavelength conversion units serially coupled in a first direction. The wavelength conversion device has a configuration in which the two or more wavelength conversion units generate respective converted lights having wavelengths different from each other to generate two or more converted lights. The two or more wavelength conversion units each include a first end surface and a second end surface that are formed in a direction parallel to the first direction, and a light entering surface that is formed in a second direction different from the first direction and which an excitation light for generating the converted light enters. Any two adjacent wavelength conversion units of the two or more wavelength conversion units are coupled to each other with the first end surface of one and the second end surface of the other being opposed to each other. The first end surface of one wavelength conversion unit positioned at one end of the wavelength conversion device of the two or more wavelength conversion units is configured to be a light extraction surface from which the two or more converted lights are extracted out of the excitation light and the two or more converted lights.

A projector according to one embodiment of the present disclosure includes: the light source apparatus according to the embodiment of the present disclosure; and an optical modulator that modulates an illumination light generated on the basis of a light from the light source apparatus to generate a projection image.

In the light source apparatus or the projector according to the embodiment of the present disclosure, the two or more converted lights out of the excitation light and the two or more converted lights are extracted from the first end surface of one wavelength conversion unit positioned at one end of the wavelength conversion device of the two or more serially coupled wavelength conversion units.

FIG. 1 is a cross-sectional view schematically illustrating an example of a configuration of a light source apparatus according to a first embodiment of the present disclosure.

FIG. 2 is a cross-sectional view illustrating, in an enlarged manner, an example of a configuration of a wavelength conversion device in the light source apparatus according to the first embodiment.

FIG. 3 is an explanatory diagram illustrating an example of an excitation (absorption) spectrum and a light emission spectrum of the wavelength conversion device in the light source apparatus according to the first embodiment.

FIG. 4 is an explanatory diagram illustrating an example of an excitation (absorption) spectrum and a light emission spectrum of a wavelength conversion device in a light source apparatus according to a comparative example.

FIG. 5 is a configuration diagram schematically illustrating an example of a configuration of a projector according to the first embodiment.

FIG. 6 is a block diagram schematically illustrating an example of a configuration of a control system of the projector according to the first embodiment.

FIG. 7 is a sequence diagram schematically illustrating a first example of a control sequence of the light source apparatus according to the first embodiment.

FIG. 8 is a sequence diagram schematically illustrating a second example of the control sequence of the light source apparatus according to the first embodiment.

FIG. 9 is a cross-sectional view schematically illustrating an example of a configuration of a light source apparatus according to a second embodiment.

FIG. 10 is a cross-sectional view schematically illustrating an example of a configuration of a light source apparatus according to a modification of the second embodiment.

FIGS. 11A, 11B, and 11C are configuration diagrams schematically illustrating an example of a configuration of a mirror array device in the light source apparatus according to the modification of the second embodiment.

MODES FOR CARRYING OUT THE INVENTION

Hereinafter, some embodiments of the present disclosure are described in detail with reference to the drawings. Note that the description will be given in the following order.

0. Comparative Example
1. First Embodiment (A configuration example in which an excitation light source is disposed for each wavelength conversion unit)
1.1 Description of Light Source Apparatus According to First Embodiment (FIGS. 1 to 4)
1.2 Description of Projector According to First Embodiment (FIGS. 5 to 8)
1.3 Effects
2. Second Embodiment (A configuration example in which an excitation light source common to two or more wavelength conversion units is disposed)
2.1 Description of Light Source Apparatus According to Second Embodiment (FIG. 9)
2.2 Modification of Second Embodiment (FIGS. 10, 11A, 11B, and 11C)
3. Other Embodiments 0. Comparative Example Overview and Problem of Light Source Apparatus According to Comparative Example A light source apparatus that generates one or more lights having one or more colors with use of a rectangular rod-shaped or rectangular pipe-shaped wavelength conversion member has been proposed.

For example, PTL 1 (Japanese Unexamined Patent Application Publication No. 2012-63567) proposes a light source apparatus having a configuration in which a phosphor is applied to a part of an inner surface of a rod-shaped optical component, and an external deflection mirror switches an entering position of an excitation light from a light source between a part with the phosphor applied and another part. In this configuration, not only the converted light resulting from wavelength conversion by excitation of the phosphor, but also the excitation light itself is used as a light emitted from the light source apparatus. This makes it possible to emit two or more lights having different wavelengths. In a case of emitting a light of a wavelength different from that of the converted light, the excitation light is emitted as it is. Therefore, in a case where a solid-state light source such as a laser is used as the light source in order to increase efficiency of wavelength conversion, a laser light is outputted directly. This involves a problem in terms of safety.

PTL 2 (Japanese Unexamined Patent Application Publication No. 2015-94824) proposes a light source apparatus having a configuration in which another light having a wavelength different from a wavelength of a light converted by a phosphor is caused to enter a tip of a rod-shaped optical component having a wall surface applied with the phosphor, and the light converted by the phosphor and the other light are synthesized by a dichroic mirror to be outputted. The dichroic mirror is disposed at the tip. With this configuration, in a case where the excitation light remains without being converted by the phosphor, such an excitation light is outputted from the light source apparatus. Therefore, there still remains a problem in terms of safety.

PTL 3 (Japanese Unexamined Patent Application Publication No. 2017-9981) proposes a light source apparatus having a configuration in which a rod coated with a yellow light emitting phosphor and a transparent rod are combined. In this configuration, a yellow phosphor is used. Therefore, in a case of an application in which color lights of R (red), G (green), and B (blue) are used in a time divisional manner, a unit for separating the color lights is additionally required.

Furthermore, in any of the above-described configurations, the light that is finally emitted from the light source apparatus includes the converted light after being subjected to the wavelength conversion by the phosphor and the light from the excitation light source or a light from another light source. In this case, a difference is caused in light ray angular distribution between the converted light and other lights, resulting in a difference in so-called etendue. Therefore, the lights of the respective wavelengths emitted from the light source apparatus involve a difference in luminance distribution when passing through an optical system. Accordingly, in a case of using it as a light source of a projector or the like, a screen involves color unevenness.

Therefore, it is desirable to develop a light source apparatus that is able to so generate two or more lights having different wavelengths that a light ray angular distribution (etendue) is substantially the same between the wavelengths.

1. First Embodiment 1.1 Description of Light Source Apparatus of First Embodiment Overview of Light Source Apparatus FIG. 1 schematically illustrates an example of a configuration of a light source apparatus 1 according to a first embodiment of the present disclosure.

The light source apparatus 1 includes a wavelength conversion device 10 and a light collection optical system 2. The wavelength conversion device 10 includes two or more wavelength conversion units. The light collection optical system 2 collects a light emitted from the wavelength conversion device 10. A light from the light source apparatus 1 is emitted to, for example, an illumination optical system of a projector, etc.

In addition, the light source apparatus 1 includes two or more excitation light sources and two or more light collection optical systems. The excitation light sources are disposed in correspondence with the two or more wavelength conversion units. Furthermore, the light source apparatus 1 includes a light emission controller (e.g., a display color controller 73 illustrated in FIG. 6 to be described later). The light emission controller controls light emission of the two or more excitation light sources independently of each other.

The two or more wavelength conversion units are serially coupled in a first direction (a Z-direction). The light source apparatus 1 has a configuration in which the two or more wavelength conversion units generate respective converted lights having wavelengths different from each other to generate two or more converted lights. The two or more converted lights generated by the two or more wavelength conversion units are extracted from a light extraction surface (a first end surface 41 of a third wavelength conversion unit 13 to be described later) of the wavelength conversion device 10, and is utilized as an illumination light for an illumination target object via the light collection optical system 2. It is preferable that a shape of a cross-section perpendicular to the first direction of each of the two or more wavelength conversion units be similar to a shape of an illumination target region of the illumination target object. The illumination target object is, for example, a display panel 120 of a projector 100 (FIG. 5) which will be described later. The illumination target region is, for example, a region corresponding to a display region of the display panel 120.

Hereinafter, a description is given referring, as an example, to a case where the wavelength conversion device 10 includes, as the two or more wavelength conversion units, a first wavelength conversion unit 11, a second wavelength conversion unit 12, and the third wavelength conversion unit 13.

The wavelength conversion device 10 includes, as the two or more excitation light sources, a first excitation light source 21, a second excitation light source 22, and a third excitation light source 23. Each of the first to the third excitation light sources 21 to 23 includes, for example, a semiconductor laser (LD), and emits an excitation light L1. It is preferable that the excitation light L1 be a light in a wavelength band different from a wavelength band of the converted light generated by each of the first to the third wavelength conversion units 11 to 13. The excitation light L1 is, for example, an ultraviolet light.

The wavelength conversion device 10 includes, as the two or more light collection optical systems, a first light collection optical system 31, a second light collection optical system 32, and a third light collection optical system 33. Each of the first to the third light collection optical systems 31 to 33 includes a light collection lens or the like. The first light collection optical system 31 is so disposed as to collect the excitation light L1 from the first excitation light source 21 toward a light entering surface (a first side surface 43 described later) of the first wavelength conversion unit 11. The second light collection optical system 32 is so disposed as to collect the excitation light L1 from the second excitation light source 22 toward a light entering surface (the first side surface 43 described later) of the second wavelength conversion unit 12. The third light collection optical system 33 is so disposed as to collect the excitation light L1 from the third excitation light source 23 toward a light entering surface (the first side surface 43 described later) of the third wavelength conversion unit 13.

Each of the first to the third wavelength conversion units 11 to 13 includes a fluorescent substance that generates converted light by emitting a fluorescent light with use of the excitation light L1. The fluorescent substance is, for example, a phosphor or a quantum dot (QD). The fluorescent substance may be a phosphor crystal. The first wavelength conversion unit 11 includes a fluorescent substance that is excited by the excitation light L1 to emit a red fluorescent light, and generates a red light L2R as the converted light. The second wavelength conversion unit 12 includes a fluorescent substance that is excited by the excitation light L1 to emit a green fluorescent light, and generates a green light L2G as the converted light. The third wavelength conversion unit 13 includes a fluorescent substance that is excited by the excitation light L1 to emit a blue fluorescent light, and generates a blue light L2B as the converted light.

Each of the first to the third wavelength conversion units 11 to 13 has, for example, a rectangular rod shape or a hollow pipe shape. Each of the first to the third wavelength conversion units 11 to 13 includes rod-shaped glass containing a phosphor therein. Further, each of the first to the third wavelength conversion units 11 to 13 may be, for example, pipe-shaped glass in which a side surface of an inner surface is coated with a phosphor. The first to the third wavelength conversion units 11 to 13 are substantially the same as each other in shape and size.

Each of the first to the third wavelength conversion units 11 to 13 includes the first end surface 41 and a second end surface 42. The first end surface 41 and the second end surface 42 are formed in a direction parallel to the first direction (the Z-direction). In the wavelength conversion device 10, any two adjacent wavelength conversion units of the first to the third wavelength conversion units 11 to 13 are coupled to each other with the first end surface 41 of one and the second end surface 42 of the other being opposed to each other. That is, the first wavelength conversion unit 11 and the second wavelength conversion unit 12 are so coupled to each other that the first end surface 41 of the first wavelength conversion unit 11 and the second end surface 42 of the second wavelength conversion unit 12 are opposed to each other. Further, the second wavelength conversion unit 12 and the third wavelength conversion unit 13 are so coupled to each other that the first end surface 41 of the second wavelength conversion unit 12 and the second end surface 42 of the third wavelength conversion unit 13 are opposed to each other.

The wavelength conversion device 10 has a configuration in which the first end surface 41 of one wavelength conversion unit (the third wavelength conversion unit 13) positioned at one end of the wavelength conversion device 10, of the first to the third wavelength conversion units 11 to 13, serves as a light extraction surface from which all of the converted lights among the excitation light L1 and all of the converted lights (the red light L2R, the green light L2G, and the blue light L2B) are to be extracted.

Further, each of the first to the third wavelength conversion units 11 to 13 includes the first side surface 43. The first side surface 43 is formed in a direction (a Y-direction) and is different from the first and the second end surfaces 41 and 42. Further, each of the first to the third wavelength conversion units 11 to 13 includes a second side surface 44. The second side surface 44 is opposed to the first side surface 43.

In each of the first to the third wavelength conversion units 11 to 13, the first side surface 43 serves as a light entering surface which the excitation light L1 enters. In each of the first to the third wavelength conversion units 11 to 13, a film that transmits the excitation light L1 and reflects other lights including the converted light is formed on a side surface (a side surface including the first and the second side surfaces 43 and 44) other than the first and the second end surfaces 41 and 42. With this configuration, in each of the first to the third wavelength conversion units 11 to 13, an excitation light L1' which has become a residual light of the wavelength conversion is emitted to outside from the second side surface 44 or the like positioned in a direction different from an extraction direction of the converted light.

The wavelength conversion device 10 further includes a reflective layer 51, a first dichroic layer 61, and a second dichroic layer 62.

The reflective layer 51 is formed on a second end surface 51 of another wavelength conversion unit (the first wavelength conversion unit 11) positioned at another end opposite to one end of the wavelength conversion device 10 of the first to the third wavelength conversion units 11 to 13. The reflective layer 51 reflects the converted light generated by at least the other wavelength conversion unit. The reflective layer 51 is, for example, a dichroic film that reflects at least the red light L2R, which is a light converted by the first wavelength conversion unit 11. Further, the reflective layer 51 may be a total reflection mirror which reflects not only the red light L2R but also lights of other wavelengths including the excitation light L1.

The first and the second dichroic layers 61 and 62 are formed between the first end surface 41 and the second end surface 42 of the two adjacent wavelength conversion units. The first and the second dichroic layers 61 and 62 transmit the converted light that exits from the first end surface 41 of one wavelength conversion unit of the two adjacent wavelength conversion units and reflect the converted light generated by at least another wavelength conversion unit of the two adjacent wavelength conversion units.

The first dichroic layer 61 is formed between the first end surface 41 of the first wavelength conversion unit 11 and the second end surface 42 of the second wavelength conversion unit 12. The first dichroic layer 61 is, for example, a dichroic film having a characteristic of transmitting the red light L2R, which is the light converted by the first wavelength conversion unit 11, and reflecting the green light L2G, which is the light converted by the second wavelength conversion unit 12. Further, the first dichroic layer 61 may be, for example, a dichroic film having a characteristic of transmitting the red light L2R, which is the light converted by the first wavelength conversion unit 11, and reflecting a light of another wavelength other than the red light L2R.

The second dichroic layer 62 is formed between the first end surface 41 of the second wavelength conversion unit 12 and the second end surface 42 of the third wavelength conversion unit 13. The second dichroic layer 62 is, for example, a dichroic film having a characteristic of transmitting the red light L2R, which is the light converted by the first wavelength conversion unit 11, and the green light L2G, which is the light converted by the second wavelength conversion unit 12, and reflecting the blue light L2B, which is the light converted by the third wavelength conversion unit 13. Further, the second dichroic layer 62 may be, for example, a dichroic film having a characteristic of transmitting the red light L2R, which is the light converted by the first wavelength conversion unit 11, and the green light L2G, which is the light converted by the second wavelength conversion unit 12, and reflecting a light of another wavelength other than the red light L2R and the green light L2G.

Working and Operation of Light Source Apparatus

FIG. 2 illustrates an example of a configuration of the wavelength conversion device 10 in the light source apparatus 1 in an enlarged manner.

First, a description is given of a case where, as illustrated in FIG. 2, only the first excitation light source 21 of the first to the third excitation light sources 21 to 23 is caused to emit light and the excitation light L1 is caused to enter only the first wavelength conversion unit 11. When the first excitation light source 21 emits light, the excitation light L1 is collected toward inside of the first wavelength conversion unit 11 via the first light collection optical system 31, and is applied to the fluorescent substance inside the first wavelength conversion unit 11. As a result, the fluorescent substance in the first light collection optical system 31 is excited by the excitation light L1, and is subjected to wavelength conversion. Further, the red light L2R which is the converted light is emitted inside the first wavelength conversion unit 11 in all directions.

The emitted red light L2R is repeatedly reflected inside the first wavelength conversion unit 11, and reaches the first dichroic layer 61 formed on a side of the adjacent second wavelength conversion unit 12. The first dichroic layer 61 has a characteristic of transmitting the red light L2R. Therefore, the red light L2R passes through the first dichroic layer 61 as it is and enters inside of the adjacent second wavelength conversion unit 12. The inside of the second wavelength conversion unit 12 includes a fluorescent substance that emits a green fluorescent light. However, a typical fluorescent substance absorbs a light of a wavelength shorter than that of the light emission color to emit light. Therefore, the red light L2R having a wavelength longer than that of green is transmitted through the inside of the second wavelength conversion unit 12 without contributing to wavelength conversion inside the second wavelength conversion unit 12.

Similarly, the red light L2R passes through the second dichroic layer 62 and inside of the third wavelength conversion unit 13, is emitted from the light extraction surface side, and is guided to the illumination optical system, etc. via the light collection optical system 2. On the side surface of each unit, a film that transmits the excitation light L1 and reflects other lights including the converted light is provided. Therefore, the excitation light L1' (the residual light) remaining in each unit without having been subjected to the wavelength conversion is emitted to the outside from the side surface of each unit. Therefore, the excitation light L1 is not emitted from the light extraction surface side.

The case of extracting the red light L2R has been described above. However, causing the second excitation light source 22 to emit a light makes it possible to extract the green light L2G from the light extraction surface side in a similar manner. Further, causing the third excitation light source 23 to emit a light makes it possible to extract the blue light L2B from the light extraction surface side in a similar manner.

Excitation (Absorption) Spectrum and Light Emission Spectrum of Wavelength Conversion Device 10

FIG. 3 illustrates an example of an excitation (absorption) spectrum and a light emission spectrum of the wavelength conversion device 10 in the light source apparatus 1. FIG. 4 illustrates an example of an excitation (absorption) spectrum and a light emission spectrum of a wavelength conversion device in a light source apparatus according to a comparative example.

As described above, a typical fluorescent substance absorbs a light having a wavelength shorter than a light emission color to emit a light. Therefore, as illustrated in FIG. 3, it is desirable that a wavelength band of the excitation (absorption) spectrum and a wavelength band of the light emission spectrum of the wavelength conversion device 10 do not overlap with each other. In a case where the wavelength bands of the excitation (absorption) spectrum and the light emission spectrum partially overlap as in the comparative example in FIG. 4, the converted light itself becomes the excitation light L1. Therefore, the converted light is reabsorbed by the fluorescent substance as the excitation light L1 in each unit. As a result, conversion efficiency is deteriorated.

Further, from a relationship between the excitation (absorption) spectrum and the light emission spectrum as described above, it is desirable that the wavelength of the converted light generated by one wavelength conversion unit (the third wavelength conversion unit 13) positioned at one end of the wavelength conversion device 10, of the two or more wavelength conversion units is shorter than the wavelength of the converted light generated by the wavelength conversion units (the first and the second wavelength conversion units 11 and 12) other than the one wavelength conversion unit. As illustrated in FIG. 1 and FIG. 2, it is desirable that the first to the third wavelength conversion units 11 to 13 be so disposed that a unit generating a converted light of a shorter wavelength is disposed closer to the light extraction surface side. Thereby, it is possible to prevent the converted light from the adjacent unit from being reabsorbed by the fluorescent substance as the excitation light L1 in the unit on the light extraction surface side.

Modification of Light Source Apparatus According to First Embodiment

In the above description, the case where the converted light is extracted for each color has been described as an example. However, light emission of the first to the third excitation light sources 21 to 23 can be controlled independently of each other. Therefore, it is possible not only to extract a light of a single color, but it is also possible, by simultaneously turn on any two or more excitation light sources, to extract a light of a mixture of any two or more colors. Further, in the configuration examples in FIGS. 1 and 2, the case where the lights of three colors of RGB are extracted has been described as an example. However, by changing the number of wavelength conversion units, it is also possible to provide a configuration to extract lights of two colors or four or more colors.

Moreover, in the configuration examples in FIGS. 1 and 2, a description has been given of a case where the first to the third wavelength conversion units 11 to 13 are substantially the same as each other in shape and size. However, for example, the lengths of the units in the Z-direction may be different from each other.

1.2 Description of Projector According to First Embodiment

Overview of Projector

FIG. 5 schematically illustrates an example of a configuration of the projector 100 according to the first embodiment.

The light source apparatus 1 according to the first embodiment can be utilized, for example, in the projector 100. The projector 100 includes the light source apparatus 1, an illumination optical system 110, the display panel 120, and a projection optical system 130.

The illumination optical system 110 includes a uniformization optical system 111 and a light collection optical system 112. The uniformization optical system 111 includes a fly-eye lens or the like. The light collection optical system 112 includes a light collection lens or the like. The illumination optical system 110 generates an illumination light on the basis of a light emitted from the light source apparatus 1 to illuminate the display panel 120.

The display panel 120 is an optical modulator that modulates the illumination light from the illumination optical system 110 on the basis of an image signal Vin to generate a projection image. For example, the display panel 120 may have a configuration using a transmissive display device (a liquid crystal display device or the like) as illustrated in FIG. 5, or may have a configuration using a reflective display device such as a LCOS (Liquid Crystal On Silicon). Further, it may be a display device using a mirror array device such as a micro-mirror array (MMA).

The projection optical system 130 is configured to include, for example, a plurality of lenses. The projection optical system 130 projects the projection image generated by the display panel 120 onto a projection surface such as a screen 131.

Overview of Control System

FIG. 6 schematically illustrates an example of a configuration of a control system of the projector 100.

The projector 100 includes a main controller 71, an image generating unit 72, and a display color controller 73.

The main controller 71 performs a control of each unit in the projector 100 on the basis of the received image signal Vin.

The image generating unit 72 generates image data for driving the display panel 120 on the basis of the image signal Vin and drives the display panel 120.

The display color controller 73 is a light emission controller that controls the light emission of the first to the third excitation light sources 21 to 23 independently of each other in accordance with a display color of the projection image to be displayed on the display panel 120.

Control Sequence

FIG. 7 schematically illustrates a first example of a control sequence of the light source apparatus 1.

FIG. 7 illustrates an example of a control sequence in a case where R, G, and B are sequentially displayed on the display panel 120 in a unit display period (one frame or one sub-frame). In this case, in the light source apparatus 1, the first excitation light source 21, the second excitation light source 22, and the third excitation light source 23 are sequentially caused to emit respective lights in accordance with the display timings of R, G, and B. As a result, the red light L2R, the green light L2G, and the blue light L2B are sequentially emitted from the light source apparatus 1 by the operation of the light source apparatus 1 described above. As a result, the display panel 120 is sequentially illuminated by the illumination lights of the respective colors based on the red light L2R, the green light L2G, and the blue light L2B.

FIG. 8 schematically illustrates a second example of the control sequence of the light source apparatus 1.

FIG. 8 illustrates an example of a control sequence in a case where R, G, B, M (magenta), C (cyan), and W (white) are sequentially displayed on the display panel 120 in a unit display period (one frame or one sub-frame). In this case, in the light source apparatus 1, the first excitation light source 21, the second excitation light source 22, and the third excitation light source 23 are caused to emit light in combination in accordance with the display timings of R, G, B, M, C, and W. At the display timings of R, G, and B, the first excitation light source 21, the second excitation light source 22, and the third excitation light source 23 are sequentially caused to emit light in the light source apparatus 1, as in the example in FIG. 7.

Further, at the display timing of M, in the light source apparatus 1, the first excitation light source 21 and the third excitation light source 23 are caused to emit light together. As a result, a magenta light, which is a mixture of colors of the red light L2R and the blue light L2B, is generated.

At the display timing of C, in the light source apparatus 1, the second excitation light source 22 and the third excitation light source 23 are caused to emit light together. As a result, a cyan light, which is a mixture of colors of the green light L2G and the blue light L2B, is generated.

At the display timing of W, the first to the third excitation light sources 21 to 23 are caused to emit light together in the light source apparatus 1. As a result, a white light, which is a mixture of colors of the red light L2R, the green light L2G, and the blue light L2B, is generated.

In this manner, the red light L2R, the green light L2G, the blue light L2B, the magenta light, the cyan light, and the white light are sequentially emitted from the light source apparatus 1 by the operation of the light source apparatus 1 described above. As a result, the display panel 120 is sequentially illuminated by the illumination light of the respective colors based on the red light L2R, the green light L2G, the blue light L2B, the magenta light, the cyan light, and the white light.

Note that the control sequences illustrated in FIGS. 7 and 8 are mere examples. A control sequence other than this may be used to control the light emission of the light source apparatus 1.

1.3 Effects

As described above, according to the light source apparatus 1 and the projector 100 of the first embodiment, two or more converted lights of the excitation light L1 and the two or more converted lights are extracted from the first end surface 41 of one wavelength conversion unit of the two or more serially coupled wavelength conversion units. Therefore, it is possible to so generate two or more lights having different wavelengths that the light ray angular distribution (etendue) is substantially the same between the wavelengths.

Moreover, according to the light source apparatus 1 and the projector 100 of the first embodiment, the following effects can be expected. First, in the light source apparatus 1, it is possible to obtain the light emission colors of RGB without using a drive system such as a color wheel. As a result, reliability against a failure is increased. Further, in the light source apparatus 1, a fluorescent light emission part of the wavelength conversion device 10 also serves as an integrator optical system. Therefore, uniform illumination to the display panel 120 in the projector 100 can be achieved. Thus, in the light source apparatus 1, the color wheel is not required, and the wavelength conversion device 10 also serves as the integrator optical system. Therefore, it is possible to achieve reduction in size of the light source apparatus 1 and the projector 100 as a whole.

In the light source apparatus 1, switching between RGB is performed not by physical switching as with a color wheel but by electrical switching. Therefore, there is no color mixture at the time of switching, and it is possible to reduce wasted time by shortening the switching time and to allow it to be brightened. Moreover, in the light source apparatus 1, the etendues of R, G, and B are substantially the same. Therefore, it helps to prevent color unevenness in a case of being mounted on the projector 100.

Moreover, the excitation light L1 is not outputted from the light extraction surface of the light source apparatus 1. Therefore, it is safe.

It is to be noted that the effects described herein are merely illustrative and not limitative, and there may be other effects. This is similarly applicable to effects of other embodiments below.

2. Second Embodiment

Next, a light source apparatus and a projector according to a second embodiment of the present disclosure are described. Note that, in the following, the same reference numerals are given to substantially the same components as those of the light source apparatus and the projector according to the first embodiment described above, and descriptions thereof will be omitted as appropriate.

2.1 Description of Light Source Apparatus According to Second Embodiment

FIG. 9 schematically illustrates an example of a configuration of a light source apparatus 1A according to the second embodiment of the present disclosure.

Compared with the configuration of the light source apparatus 1 (FIG. 1) according to the first embodiment, the light source apparatus 1A according to the second embodiment includes an excitation light source 20 commonly used for the first to the third wavelength conversion units 11 to 13, instead of the first to the third excitation light sources 21 to 23. Further, compared with the configuration of the light source apparatus 1 according to the first embodiment, the light source apparatus 1A includes a single light collection optical system 30 instead of the first to the third light collection optical systems 31 to 33. Further, the light source apparatus 1A includes a scanning mirror 80.

The light collection optical system 30 collects the excitation light L1 from the excitation light source 20 toward the scanning mirror 80. The scanning mirror 80 is a deflecting element which varies a traveling direction of the excitation light L1 from the excitation light source 20 and time-divisionally causes it to enter each of the first to the third wavelength conversion units 11 to 13.

In the light source apparatus 1A, the traveling direction of the excitation light L1 can be varied by varying an angle of the scanning mirror 80. Thus, the excitation light L1 from the excitation light source 20 can be caused to enter any of the first to the third wavelength conversion units 11 to 13. Thus, the working of the wavelength conversion device 10 similar to that of the light source apparatus 1 according to the first embodiment allows a light of a color corresponding to the unit to which it enters among the red light L2R, the green light L2G, and the blue light L2B is emitted from the light source apparatus 1A.

According to the light source apparatus 1A of the second embodiment, the following effects can be expected.

Because the excitation light source 20 can be used commonly for the units of the wavelength conversion device 10, it is not necessary to prepare more than one excitation light source 20. Therefore, it is possible to reduce the size and the cost of the light source apparatus 1A.

Note that, with the combination of the single excitation light source 20 and the single scanning mirror 80 as in the light source apparatus 1A, it is difficult to output two or more color lights together by exciting the two or more wavelength conversion units of the wavelength conversion device 10 together. In contrast, by using a plurality of deflecting elements (deflecting mirrors), it is possible to output the two or more color lights together by exciting the two or more wavelength conversion units together. In this case, it is necessary to provide deflecting mirrors corresponding to the number of the wavelength conversion units to be excited together. For example, three deflecting mirrors are disposed and the excitation light L1 from the single excitation light source 20 is caused to enter the first to the third wavelength conversion units 11 to 13 together. Thereby, it is possible to output the red light L2R, the green light L2G, and the blue light L2B together.

Other configurations, operation, and effects may be substantially similar to those of the light source apparatus 1 according to the first embodiment described above.

2.2 Modification of Second Embodiment

FIG. 10 is a cross-sectional view schematically illustrating an example of a configuration of a light source apparatus 1B according to a modification of the second embodiment. FIGS. 11A, 11B, and 11C schematically illustrate an example of a configuration of a mirror array device 90 in the light source apparatus 1B.

The light source apparatus 1B according to the modification includes the mirror array device 90, as a deflecting element, instead of the scanning mirror 80, with respect to the configuration of the light source apparatus 1A (FIG. 9) according to the second embodiment. Further, the light source apparatus 1B according to the modification includes a light collection optical system 34.

The mirror array device 90 includes two or more mirrors 91. Each of the two or more mirrors 91 is supported by a supporting part 92. Each of the two or more the mirrors 91 is allowed to vary a deflection direction relative to an entering light by varying a mirror angle thereof. The angles of the two or more mirrors 91, for example, are controllable independently of each other. Each of the angles of the two or more mirrors 91 is controllable at an angle in accordance with an ON state FIG. 11A, a neutral state FIG. 11B, and an OFF state FIG. 11C of the drive voltage. Thus, in the light source apparatus 1B, the excitation light L1 from the excitation light source 20 is allowed to enter any unit of the first to the third wavelength conversion units 11 to 13 via the light collection optical system 34.

According to the light source apparatus 1B according to the modification, the mirror array device 90 is provided in place of the scanning mirror 80. This allows for color light switching at a higher speed, thereby reducing wasted time. Moreover, the angles of the two or more mirrors 91 of the mirror array device 90 are controllable independently of each other, and it is possible to vary the deflection directions in two or more directions at the same time. Therefore, even with the configuration including the single excitation light source 20 and the single mirror array device 90, the two or more wavelength conversion units of the wavelength conversion device 10 are excited together, making it possible to output two or more color lights together.

Other configurations, operation, and effects may be substantially similar to those of the light source apparatus 1 according to the first embodiment described above or the light source apparatus 1A according to the second embodiment described above.

3. Other Embodiments

The technology according to the present disclosure is not limited to the description of each of the above embodiments, and various modifications can be made.

For example, in the first embodiment described above, the description is given of a case where the light source apparatus according to the present disclosure is applied to the projector. However, the light source apparatus according to the present disclosure is applicable to any apparatus other than the projector.

For example, the present technology may also have any of the following configurations.

According to the present technology having the following configurations, it is possible to so generate two or more lights having different wavelengths that the light ray angular distributions is substantially the same between the wavelengths.

(1)

A light source apparatus including
a wavelength conversion device that includes two or more wavelength conversion units serially coupled in a first direction, the wavelength conversion device having a configuration in which the two or more wavelength conversion units generate respective converted lights having wavelengths different from each other to generate two or more converted lights, in which the two or more wavelength conversion units each include
a first end surface and a second end surface that are formed in a direction parallel to the first direction, and
a light entering surface that is formed in a second direction different from the first direction and which an excitation light for generating the converted light enters, any two adjacent wavelength conversion units of the two or more wavelength conversion units are coupled to each other with the first end surface of one and the second end surface of the other being opposed to each other, and the first end surface of one wavelength conversion unit positioned at one end of the wavelength conversion device of the two or more wavelength conversion units is configured to be a light extraction surface from which the two or more converted lights are extracted out of the excitation light and the two or more converted lights.

(2)

The light source apparatus according to (1) described above, in which the two or more wavelength conversion units each include a fluorescent substance that emits a fluorescent light with the excitation light to generate the converted light.

(3)

The light source apparatus according to (1) or (2) described above, in which the wavelength conversion device includes a reflective layer, the reflective layer being formed on the second end surface of another wavelength conversion unit positioned at another end opposite to one end of the wavelength conversion device of the two or more wavelength conversion units, the reflective layer reflecting the converted light generated by at least the other wavelength conversion unit.

(4)

The light source apparatus according to any one of (1) to (3) described above, in which the wavelength conversion device includes a wavelength selection layer, the wavelength selection layer being formed between the first end surface and the second end surface of the two adjacent wavelength conversion units, the wavelength selection layer transmitting the converted light that exits from the first end surface of one wavelength conversion unit of the two adjacent wavelength conversion units and reflecting the converted light generated by at least another wavelength conversion unit of the two adjacent wavelength conversion units.

(5)

The light source apparatus according to any one of (1) to (4) described above, in which a wavelength of the converted light generated by one wavelength conversion unit positioned at one end of the wavelength conversion device of the two or more wavelength conversion units is shorter than a wavelength of the converted light generated by a wavelength conversion unit other than the one wavelength conversion unit of the two or more wavelength conversion units.

(6)

The light source apparatus according to any one of (1) to (5) described above, in which the two or more wavelength conversion units each have a wavelength band of an absorption wavelength of the excitation light and a wavelength band of the converted light that are different from each other.

(7)

The light source apparatus according to any one of (1) to (6) described above, in which
the two or more wavelength conversion units each have a side surface formed in a direction different from that of the first and the second end surfaces, and the light entering surface is formed on a part of the side surface, and the wavelength conversion device has a film that is formed on the side surface, transmits the excitation light, and reflects the converted light.

(8)

The light source apparatus according to any one of (1) to (7) described above, in which the converted light extracted from the light extraction surface of the wavelength conversion device is utilized as illumination light for an illumination target object, and a shape of a cross-section perpendicular to the first direction of each of the two or more wavelength conversion units is similar to a shape of an illumination target region of the illumination target object.

(9)

The light source apparatus according to any one of (1) to (8) described above, further including at least one excitation light source that emits the excitation light.

(10)

The light source apparatus according to (9) described above, including two or more the excitation light sources, in which the excitation light source is provided for each of the two or more wavelength conversion units.

(11)

The light source apparatus according to (10) described above, further including a light emission controller that controls light emission of the two or more excitation light sources independently of each other.

(12)

The light source apparatus according to (9) described above, in which the excitation light source is provided common to the two or more wavelength conversion units, and a deflecting element is further provided, the deflecting element time-divisionally causing the excitation light from the excitation light source to enter each of the two or more wavelength conversion units.

(13)

The light source apparatus according to (12) described above, in which the deflecting element includes a mirror array device including two or more mirrors.

(14)

A projector including:

a light source apparatus; and an optical modulator that modulates an illumination light generated on the basis of a light from the light source apparatus to generate a projection image, in which the light source apparatus includes a wavelength conversion device that includes two or more wavelength conversion units serially coupled in a first direction, the wavelength conversion device having a configuration in which the two or more wavelength conversion units generate respective converted lights having wavelengths different from each other to generate two or more converted lights, the two or more wavelength conversion units each include a first end surface and a second end surface that are formed in a direction parallel to the first direction, and a light entering surface that is formed in a second direction different from the first direction and which an excitation light for generating the converted light enters, any two adjacent wavelength conversion units of the two or more wavelength conversion units are coupled to each other with the first end surface of one and the second end surface of the other being opposed to each other, and the first end surface of one wavelength conversion unit positioned at one end of the wavelength conversion device of the two or more wavelength conversion units is configured to be a light extraction surface from which the two or more converted lights are extracted out of the excitation light and the two or more converted lights.

The present application claims priority based on Japanese Patent Application No. 2018-151985 filed with the Japan Patent Office on Aug. 10, 2018, the entire content of which is incorporated herein by reference.

It should be understood that those skilled in the art would make various modifications, combinations, sub-combinations, and alterations depending on design requirements and other factors, and they are within the scope of the attached claims or the equivalents thereof.

The invention claimed is:

1. A light source apparatus comprising a wavelength conversion device that includes two or more wavelength conversion units serially coupled in a first direction, the wavelength conversion device having a configuration in which the two or more wavelength conversion units generate respective converted lights having wavelengths different from each other to generate two or more converted lights, wherein the two or more wavelength conversion units each include a first end surface and a second end surface that are formed in a direction parallel to the first direction, and a light entering surface that is formed in a second direction different from the first direction and which an excitation light for generating the converted light enters, any two adjacent wavelength conversion units of the two or more wavelength conversion units are coupled to each other with the first end surface of one and the second end surface of the other being opposed to each other, and the first end surface of one wavelength conversion unit positioned at one end of the wavelength conversion device of the two or more wavelength conversion units is configured to be a light extraction surface from which the two or more converted lights are extracted out of the excitation light and the two or more converted lights.

2. The light source apparatus according to claim 1, wherein the two or more wavelength conversion units emit a fluorescent light with the excitation light to generate the converted light.

3. The light source apparatus according to claim 1, wherein the wavelength conversion device includes a reflective layer, the reflective layer being formed on the second end surface of another wavelength conversion unit positioned at another end opposite to one end of the wavelength conversion device of the two or more wavelength conversion units, the reflective layer reflecting the converted light generated by at least the other wavelength conversion unit.

4. The light source apparatus according to claim 1, wherein the wavelength conversion device includes a wavelength selection layer, the wavelength selection layer being formed between the first end surface and the second end surface of the two adjacent wavelength conversion units, the wavelength selection layer transmitting the converted light that exits from the first end surface of one wavelength conversion unit of the two adjacent wavelength conversion units and reflecting the converted light generated by at least another wavelength conversion unit of the two adjacent wavelength conversion units.

5. The light source apparatus according to claim 1, wherein a wavelength of the converted light generated by one wavelength conversion unit positioned at one end of the wavelength conversion device of the two or more wavelength conversion units is shorter than a wavelength of the converted light generated by a wavelength conversion unit other than the one wavelength conversion unit of the two or more wavelength conversion units.

6. The light source apparatus according to claim 1, wherein the two or more wavelength conversion units each have a wavelength band of an absorption wavelength of the excitation light and a wavelength band of the converted light that are different from each other.

7. The light source apparatus according to claim 1, wherein
two or more wavelength conversion units each have a side surface formed in a direction different from that of the first and the second end surfaces, and the light entering surface is formed on a part of the side surface, and
the wavelength conversion device has a film that is formed on the side surface, transmits the excitation light, and reflects the converted light.

8. The light source apparatus according to claim 1, wherein
the converted light extracted from the light extraction surface of the wavelength conversion device is utilized as illumination light for an illumination target object, and
a shape of a cross-section perpendicular to the first direction of each of the two or more wavelength conversion units is similar to a shape of an illumination target region of the illumination target object.

9. The light source apparatus according to claim 1, further comprising at least one excitation light source that emits the excitation light.

10. The light source apparatus according to claim 9, comprising
two or more the excitation light sources, wherein
the excitation light source is provided for each of the two or more wavelength conversion units.

11. The light source apparatus according to claim 10, further comprising a light emission controller that controls light emission of the two or more excitation light sources independently of each other.

12. The light source apparatus according to claim 9, wherein
the excitation light source is provided common to the two or more wavelength conversion units, and
a deflecting element is further provided, the deflecting element time-divisionally causing the excitation light from the excitation light source to enter each of the two or more wavelength conversion units.

13. The light source apparatus according to claim 12, wherein the deflecting element comprises a mirror array device including two or more mirrors.

14. A projector comprising:
a light source apparatus; and
an optical modulator that modulates an illumination light generated on a basis of a light from the light source apparatus to generate a projection image, wherein
the light source apparatus includes a wavelength conversion device that includes two or more wavelength conversion units serially coupled in a first direction, the wavelength conversion device having a configuration in which the two or more wavelength conversion units generate respective converted lights having wavelengths different from each other to generate two or more converted lights,
the two or more wavelength conversion units each include
a first end surface and a second end surface that are formed in a direction parallel to the first direction, and
a light entering surface that is formed in a second direction different from the first direction and which an excitation light for generating the converted light enters,
any two adjacent wavelength conversion units of the two or more wavelength conversion units are coupled to each other with the first end surface of one and the second end surface of the other being opposed to each other, and
the first end surface of one wavelength conversion unit positioned at one end of the wavelength conversion device of the two or more wavelength conversion units is configured to be a light extraction surface from which the two or more converted lights
are extracted out of the excitation light and the two or more converted lights.

* * * * *